(12) United States Patent
Gradl et al.

(10) Patent No.: US 11,333,105 B1
(45) Date of Patent: May 17, 2022

(54) THRUST CHAMBER LINER AND FABRICATION METHOD THEREFOR

(71) Applicant: United States of America as represented by the Administrator of NASA, Washington, DC (US)

(72) Inventors: Paul R. Gradl, Owens Cross Roads, AL (US); William C. C. Brandsmeier, Owens Cross Roads, AL (US); Sandra Elam Greene, Huntsville, AL (US); Justin R. Jackson, Huntsville, AL (US); Cory R. Medina, Albuquerque, NM (US); Omar R. Mireles, Vestavia Hills, AL (US); Christopher Stephen Protz, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/860,989

(22) Filed: Apr. 28, 2020

Related U.S. Application Data

(63) Continuation-in-part of application No. 15/965,184, filed on Apr. 27, 2018, now abandoned.

(51) Int. Cl.
| | |
|---|---|
| *F02K 9/62* | (2006.01) |
| *C22C 9/06* | (2006.01) |
| *B33Y 10/00* | (2015.01) |
| *B33Y 80/00* | (2015.01) |
| *B22F 10/00* | (2021.01) |
| *F02K 9/97* | (2006.01) |

(52) U.S. Cl.
CPC ............... *F02K 9/62* (2013.01); *B22F 10/00* (2021.01); *B33Y 10/00* (2014.12); *B33Y 80/00* (2014.12); *C22C 9/06* (2013.01); *F02K 9/97* (2013.01); *B22F 2301/10* (2013.01)

(58) Field of Classification Search
CPC ..... F02K 9/60; F02K 9/62; F02K 9/97; B33Y 80/00
See application file for complete search history.

(56) References Cited

U.S. PATENT DOCUMENTS

| | | | | |
|---|---|---|---|---|
| 6,042,152 A | * | 3/2000 | Baldwin | ................. F16L 47/02 285/55 |
| 2013/0305727 A1 | * | 11/2013 | Yousefiani | ................ F02K 1/78 60/770 |
| 2015/0298213 A1 | * | 10/2015 | Beyer | ..................... B22F 7/008 419/7 |

(Continued)

OTHER PUBLICATIONS

Freedictionary.com, Noble Metals, Apr. 25, 2015, Thefreedictionary. com (Year: 2015).*

(Continued)

*Primary Examiner* — Todd E Manahan
*Assistant Examiner* — Kyle Robert Thomas
(74) *Attorney, Agent, or Firm* — Jerry L. Seemann; Helen M. Gaius

(57) ABSTRACT

A thrust chamber liner includes a metallic combustion chamber having an annular protrusion extending radially away from an exterior surface of the combustion chamber adjacent to its injector opening. A metallic nozzle is coupled to the combustion chamber at its throat opening. A composite material encases the exterior surface of the combustion chamber, but is only bonded to the annular protrusion.

15 Claims, 11 Drawing Sheets

(56) References Cited

U.S. PATENT DOCUMENTS

2017/0107945 A1\* 4/2017 Tertre .................. F02K 9/52

OTHER PUBLICATIONS

Aircraft Materials, Nickel Alloy 80A/Nimonic 80A, Sep. 11, 2016, Aircraft Materials (Year: 2016).\*
Sufiiarov, V.S., The effect of layer thickness at selective laser melting, 2017, Elsevier Ltd., Procedia Engineering (Year: 2017).\*

\* cited by examiner

THRUST CHAMBER LINER AND FABRICATION METHOD THEREFOR

CROSS-REFERENCE TO RELATED PATENT APPLICATIONS

This is a continuation-in-part of co-pending application Ser. No. 15/965,184, filed Apr. 27, 2018.

ORIGIN OF THE INVENTION

The invention described herein was made by employees of the United States Government and may be manufactured and used by or for the Government of the United States of America for governmental purposes without the payment of any royalties thereon or therefore.

BACKGROUND OF THE INVENTION

1. Field of the Invention

This invention relates to rocket engine thrust chamber assemblies. More specifically, the invention is a thrust chamber liner with a tangentially-coupled composite overwrap.

2. Description of the Related Art

The basic operation of a liquid rocket engine provides thrust through injection of a fuel and oxidizer into a combustion chamber for the formation of hot gases that expand through a nozzle. The assembly supporting this process is what is known as a thrust chamber assembly (TCA). In general, a TCA includes an injector, a main combustion chamber (MCC), and a nozzle portion. In order to properly maintain adequate temperatures for the materials that make up the wall of the thrust chamber, the walls are regeneratively-cooled using the fuel or oxidizer as a coolant prior to its being injected into the TCA combustion chamber for the combustion process. As the heat flux further down the nozzle decreases, a radiantly-cooled nozzle extension can be used to reduce weight of the TCA.

A typical TCA includes an injector that is bolted or welded to a combustion chamber that, in turn, is bolted or welded to the regeneratively-cooled portion of the nozzle. At each join location or joint, very tight tolerances are required with polished surface finishes and complex seals in order to prevent leakage. These joints also require tight-tolerance concentricity of each component and ancillary features such as shear-lips to prevent hot gas circulation in the join and/or joint separation. Each such joint presents a possible leakage location that can cause burn-through of adjacent components and catastrophic failure of the engine or vehicle.

The complex TCA joints also require several design iterations to determine the optimal axial locations based on allowable cooling for the materials used, and to ensure a design option that properly cools all of the material at all locations along the TCA wall. Some of the most problematic design issues occur in the downstream end of the main combustion chamber and the upstream end of the nozzle where the coolant enters. There is a finite amount of material required in these locations where the coolant channels start and the material/design must contain the pressure within. Any uncooled portions will see very high temperatures potentially leading to material erosion if not designed properly. The design complexity is inherent due to the use of separate manifolds for each component. The joints, even when properly sealed, add significant weight since they must have a series of bolt-hole patterns (outboard of the actual combustion chamber/nozzle hotwall) to put the joint in proper compression for sealing. The joints also require high tolerances to properly fit and prevent any forward facing steps into the hot gas flow.

Typical TCAs utilize a variety of separately-fabricated components due to manufacturing complexities and the use of different materials for the different components leading to increased cost, complexity, and fabrication time. Another disadvantage of separately-fabricated components is the inability to fully optimize the inlet and outlet manifold flow circuits. The inlet manifolds for the combustion chamber and nozzle are located at the same point to optimize the colder fluid flows for the higher heat flux regions. Since the components are fabricated separately, separate manifolds are fabricated for the main combustion chamber outlet and nozzle inlet leading to the above-described sealing and weight issues.

SUMMARY OF THE INVENTION

Accordingly, it is an object of the present invention to provide a thrust chamber liner.

Other objects and advantages of the present invention will become more obvious hereinafter in the specification and drawings.

In accordance with the present invention, a thrust chamber liner for a rocket engine includes a metallic combustion chamber having an injector opening and a throat opening at opposing axial ends thereof. The combustion chamber includes an annular protrusion extending radially away from an exterior surface of the combustion chamber adjacent to its injector opening. A metallic nozzle is coupled to the combustion chamber at its throat opening. A composite material encases the exterior surface of the combustion chamber, but is only bonded to the annular protrusion.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 13:
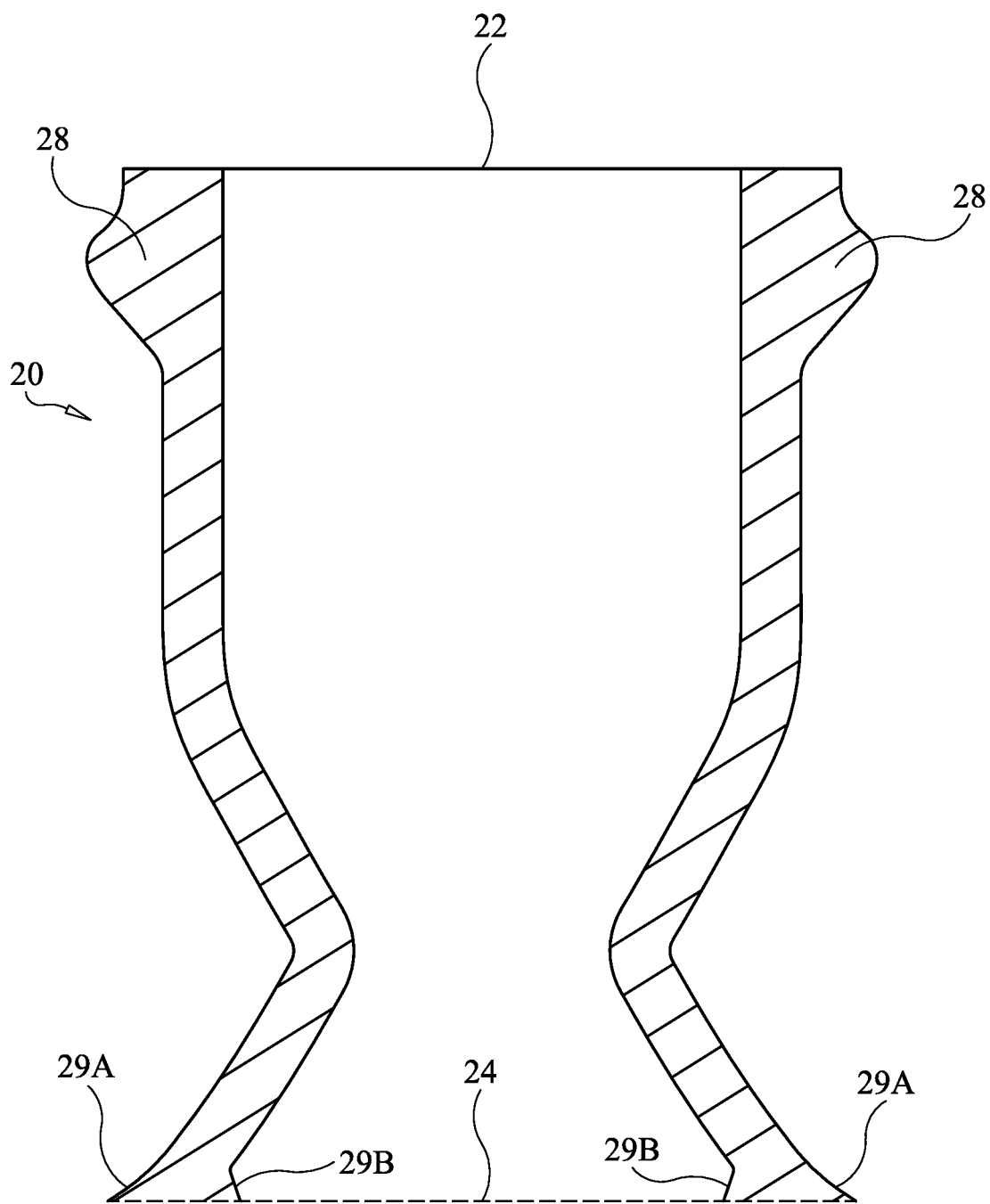
FIG. 13 is a cross-sectional view of an additively-built combustion chamber illustrating first and second rings of combustion chamber material at an axial end thereof where a nozzle will be additively built in accordance with an embodiment of the present invention.
Figure 14:
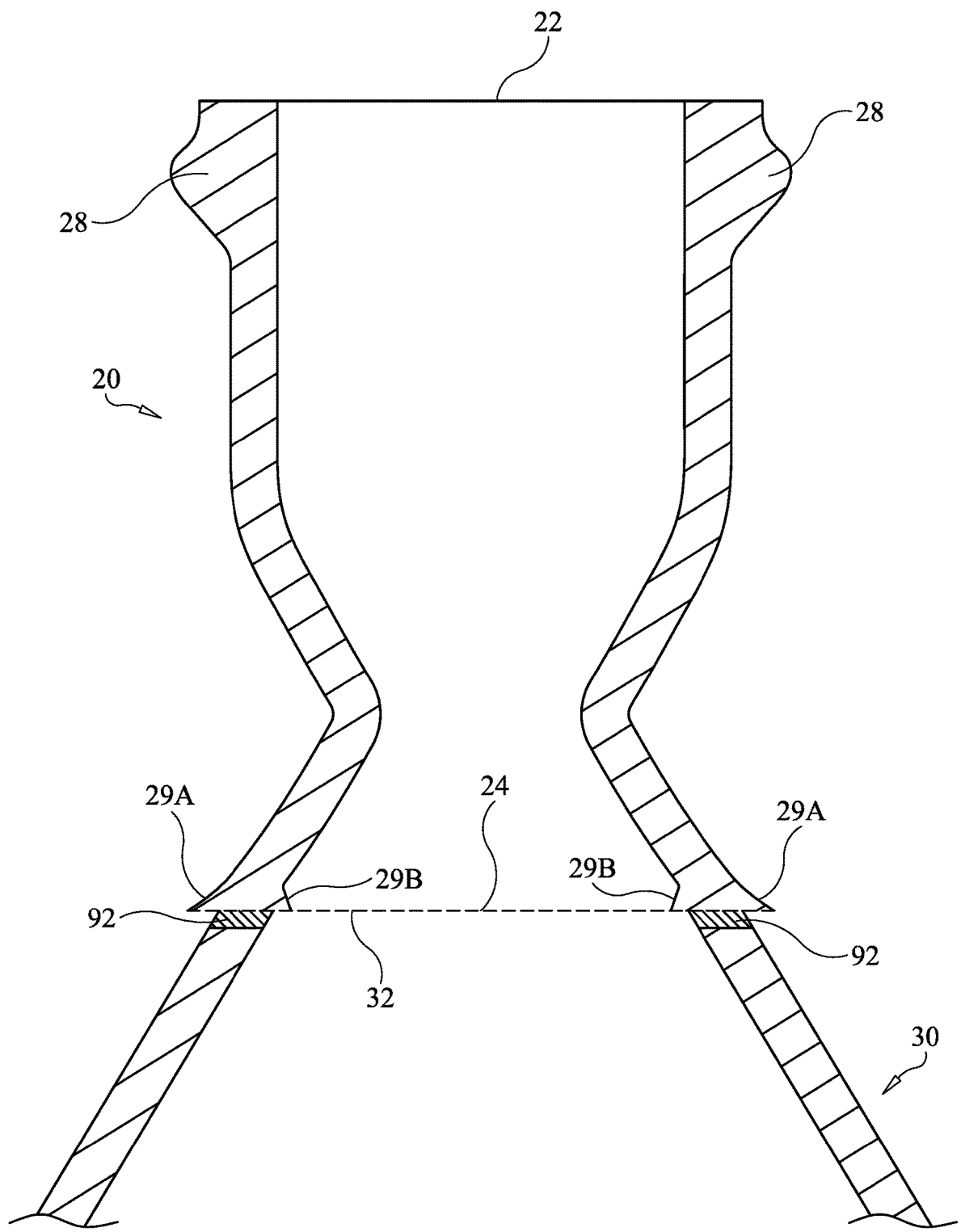
Figure 15:
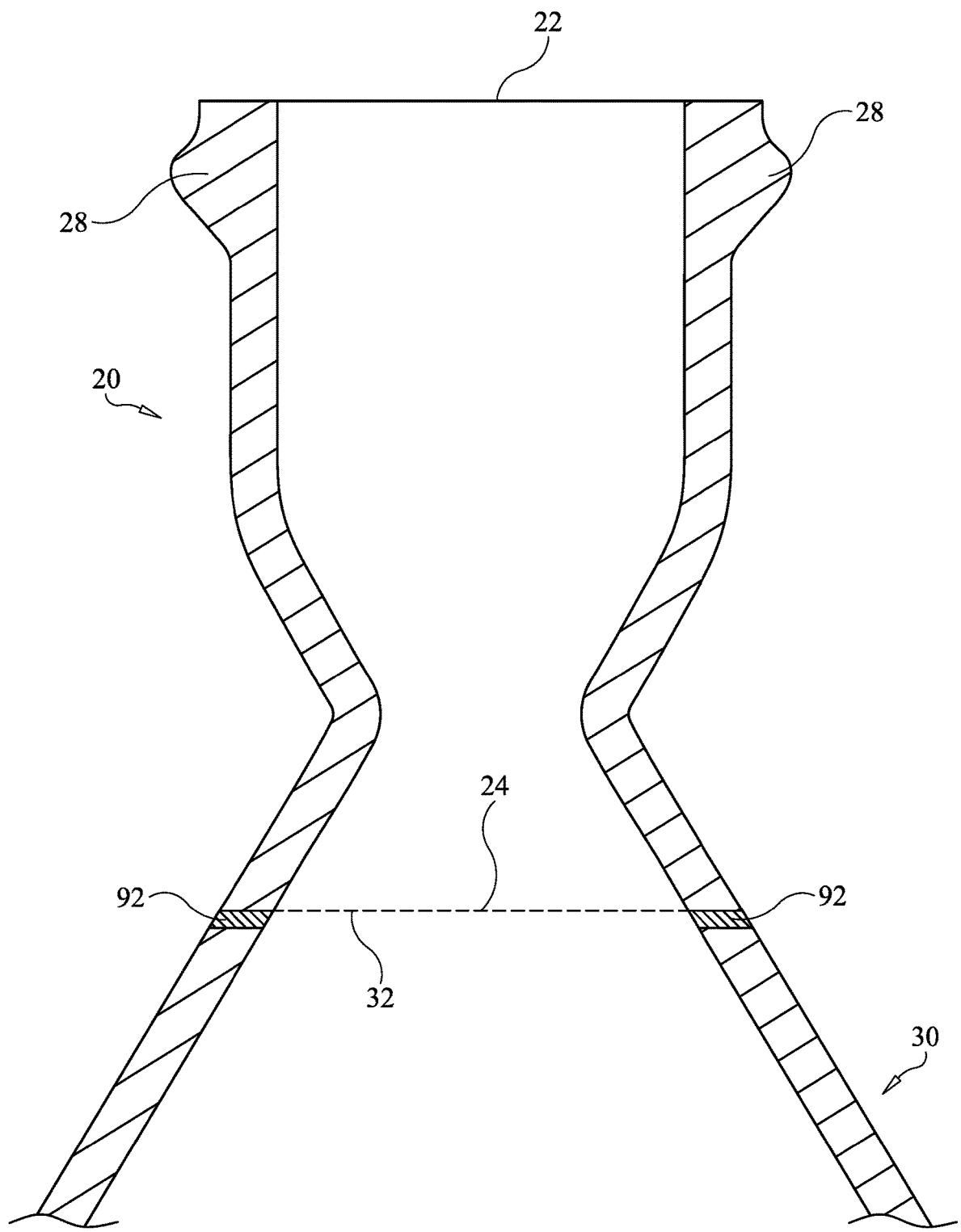

FIG. 14 is a cross-sectional view of the additively-built combustion chamber, the first and second rings of combustion chamber material at an axial end thereof, and a portion of the nozzle additively built on the first and second rings, in accordance with an embodiment of the present invention; and FIG. 15 is a cross-sectional view of structure illustrated in FIG. 13 after protruding or exposed portions of the first and second rings have been removed in accordance with an embodiment of the present invention.

DESCRIPTION OF THE PREFERRED EMBODIMENT(S)

Figure 1:
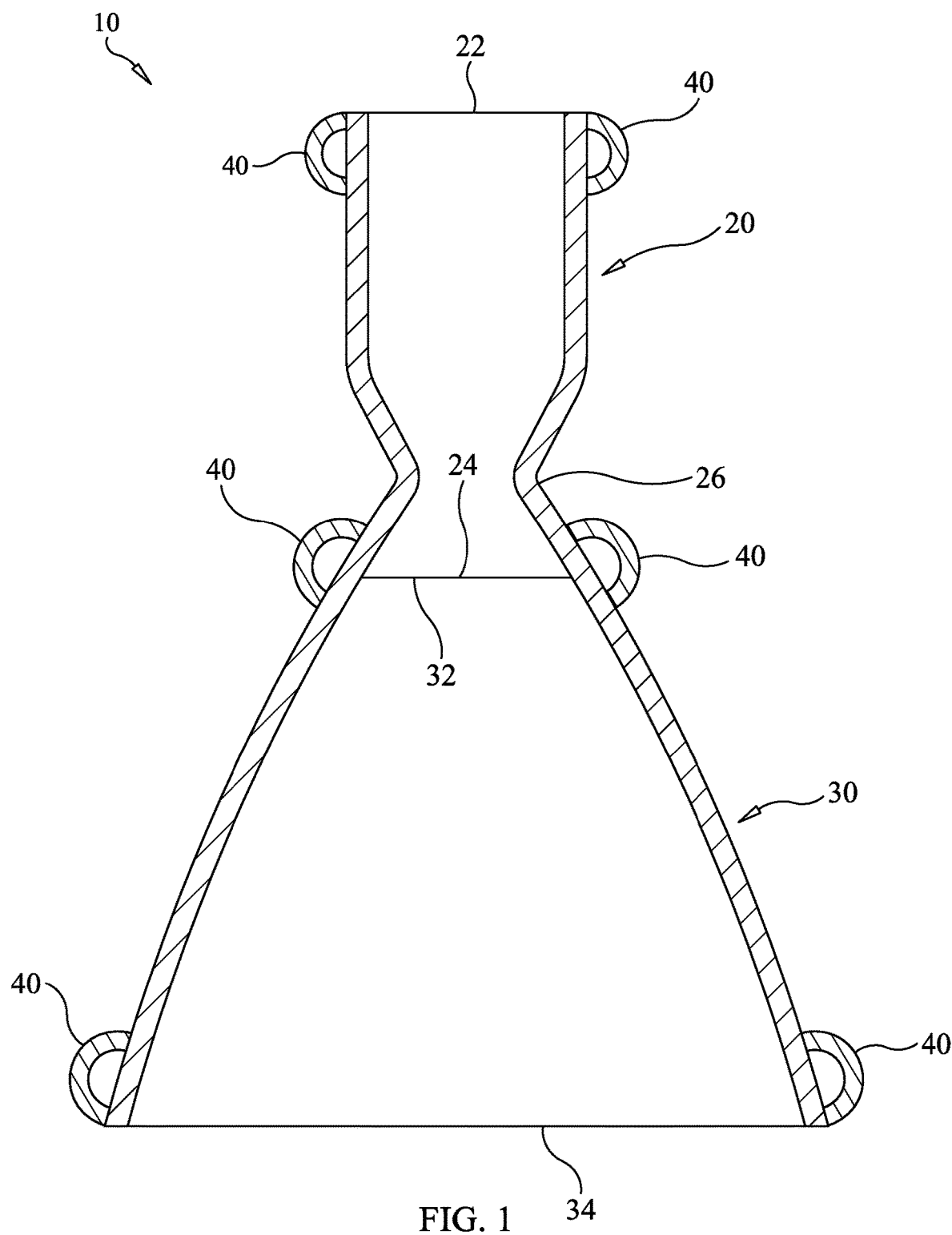
FIG. 1 is a cross-sectional view of an integrated thrust chamber liner and manifolds of a thrust chamber assembly to include a main combustion chamber, a nozzle, and coolant-channel manifolds in accordance with an embodiment of the present invention.

Referring now to the drawings and more particularly to FIG. 1, a cross-sectional view of a thrust chamber liner to include coolant manifolds of a thrust chamber assembly (TCA) in accordance with an embodiment of the present invention is shown and will be referred to hereinafter as TCA liner 10. As is known in the art, a TCA liner forms a portion of a rocket engine that includes a number of parts/systems coupled thereto that have been omitted from the figures for clarity of illustration. Such parts/systems are well-known in the art and do not comprise or limit the novel features of the present invention.

TCA liner 10 includes a main combustion chamber (MCC) 20, a nozzle 30, and a number of coolant-channel manifolds 40 that facilitate movement of coolant fluid (e.g., fuel or oxidizer) along axial coolant channels (not shown in FIG. 1 for clarity of illustration) incorporated in MCC 20 and nozzle 30. It is to be understood that the illustrated shapes of MCC 20, nozzle 30, and manifolds 40 are exemplary and that other shapes can be used without departing from the scope of the present invention. It is further to be understood that the sizes of the various features illustrated in the drawings referred to herein are for clarity of illustration and are not drawn to scale.

In general, MCC 20 has an injector end or inlet 22, a downstream outlet 24, and a throat 26 disposed between inlet 22 and outlet 24. Due to the extreme heat generated in MCC 20, a high-thermally conductive material (e.g., copper-alloys GRCop-84, C18150, C18200, AMZIRC, GLIDCOP) is used for MCC 20. As mentioned above and as will be explained further below, axially-aligned coolant channels (not shown in FIG. 1) are integrated into the walls of MCC 20.

Nozzle 30 has an inlet 32 and an outlet 34. As will be explained further below, the present invention includes a novel fabrication process that provides for the integration of inlet 32 of nozzle 30 to outlet 24 of MCC 20. This is a significant achievement in the art given that nozzle 30 is generally made from a lower thermal conductivity material such as a stainless steel (e.g., A-286, 321, 347) or a superalloy (e.g., INCONEL 625, HAYNES 230). As mentioned above and as will be explained further below, axially-aligned and closed coolant channels (if included in the TCA design) are integrated into some or all of the length of the walls of nozzle 30 between inlet 32 and outlet 34.

Manifolds 40 are integrated with the outside of MCC 20 and nozzle 30. In general, manifolds 40 encircle TCA liner 10 and fluidly couple coolant channels in MCC 20 and/or nozzle 30 to thereby define coolant circuits. Manifolds can be made from a stainless steel (e.g., A-286, 321, 347), a superalloy (e.g., INCONEL 625, HAYNES 230), or a multi-metallic combination of these. Manifolds 40 are integrated with MCC 20 and/or nozzle 30 using a bimetallic deposition process as will be explained further below. Manifold 40 at inlet 22 and outlet 34 introduces or supplies coolant fluid into MCC 20 and nozzle 30, while the remaining manifolds 40 facilitate extraction of the coolant fluid for use in MCC 20 when the coolant fluid is a fuel or oxidizer.

Figure 3:
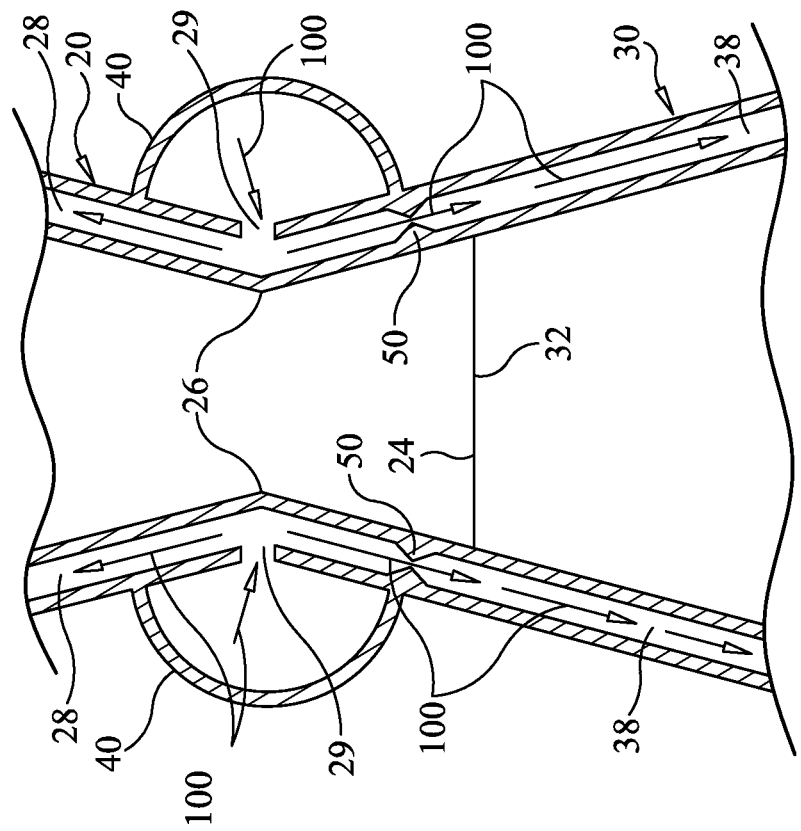
FIG. 3 is a cross-sectional schematic view of a portion of the main combustion chamber and nozzle illustrating a single coolant-supply manifold at the throat of the main combustion chamber in accordance with another embodiment of the present invention.
Figure 2:
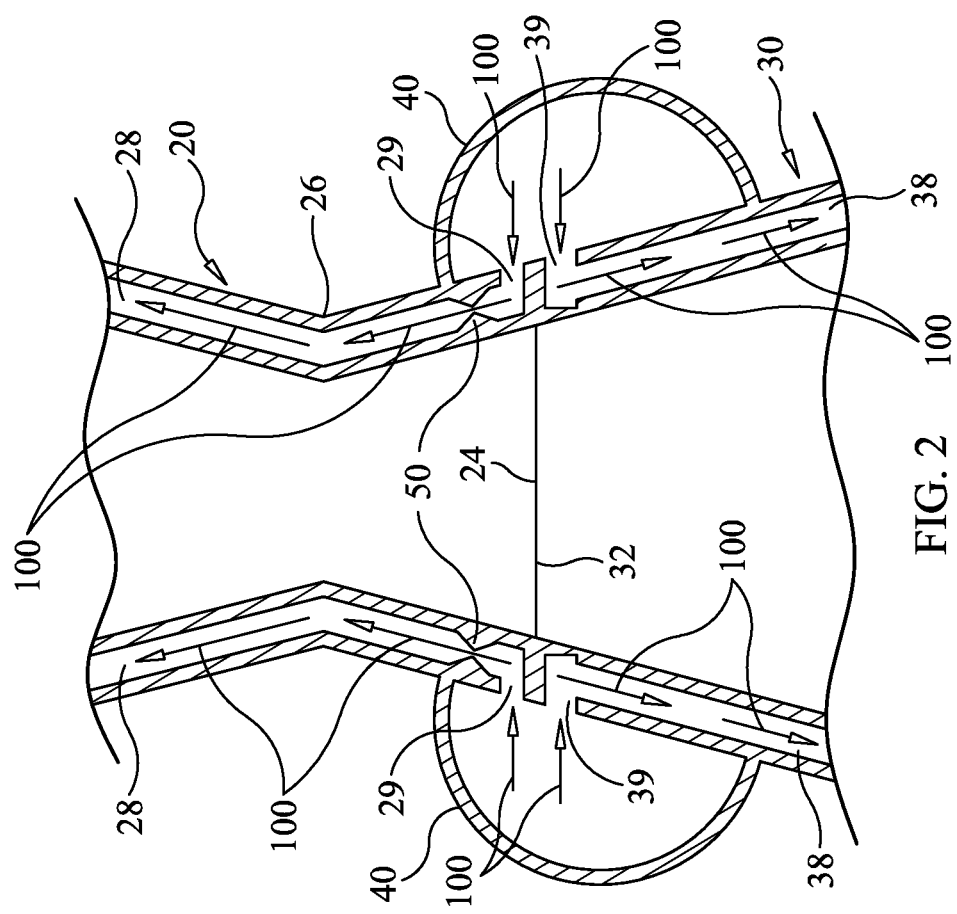
FIG. 2 is a cross-sectional schematic view of a portion of the main combustion chamber and nozzle illustrating a single coolant-supply manifold at the interface of the main combustion chamber and nozzle in accordance with an embodiment of the present invention.

Referring now to FIGS. 2 and 3, schematic cross-sectional views are presented of a portion of MCC 20 interfacing with a portion of nozzle 30. In each illustrated embodiment, a single coolant-supply manifold 40 is used to facilitate the introduction of coolant into the coolant channels of the MCC and the coolant channels of the nozzle. In each embodiment, each of closed coolant channels 28 of MCC 20 are in fluidic communication with one or more coolant channels 38 of nozzle 30. For example, in FIG. 2, each coolant channel 28 is ported at 29 to the outside surface of MCC 20 at outlet 24, and each coolant channel 38 is ported at 39 to the outside surface of nozzle 30 at inlet 32. The single coolant-supply manifold 40 links all ports 29 and 39 to the supply of coolant.

Manifold 40 is integrally coupled to the outside of surfaces of MCC 20 and nozzle 30 such that ports 29 and 39 are in fluid communication with the coolant-supply manifold 40 as shown. In this way, coolant fluid injected into the coolant-supply manifold 40 (which encircles TCA liner 10) is made available to each MCC coolant channel 28 and each nozzle coolant channel 38 as indicated by arrows 100. To control coolant fluid amounts and rates in channels 28 and 38, flow restrictors (e.g., integral flow orifices, venturis, cavitating venturis, etc.) can be incorporated into each coolant channel 28 and/or each coolant channel 38. For example FIG. 2 illustrates a flow restrictor 50 in each coolant channel 28.

Referring now to the FIG. 3, another single coolant-supply manifold design is illustrated. In this embodiment, each port 29 is provided at throat 26 of MCC 20, and each coolant channel 28 is contiguous with a corresponding coolant channel 38. Such coolant channel coupling is made possible by the novel fabrication process to be described later below. The coolant-supply manifold 40 is integrally coupled to the outside surface of MCC 20 and encircles throat 26. In this way, coolant fluid 100 injected into the coolant-supply manifold 40 is made available to each coolant channel 28 where it can travel to each corresponding coolant channel 38. As in the previous embodiment, a flow restrictor 50 can be placed in each coolant channel 28 (and/or in coolant channel 38) to control flow amounts/rates.

Figure 4:
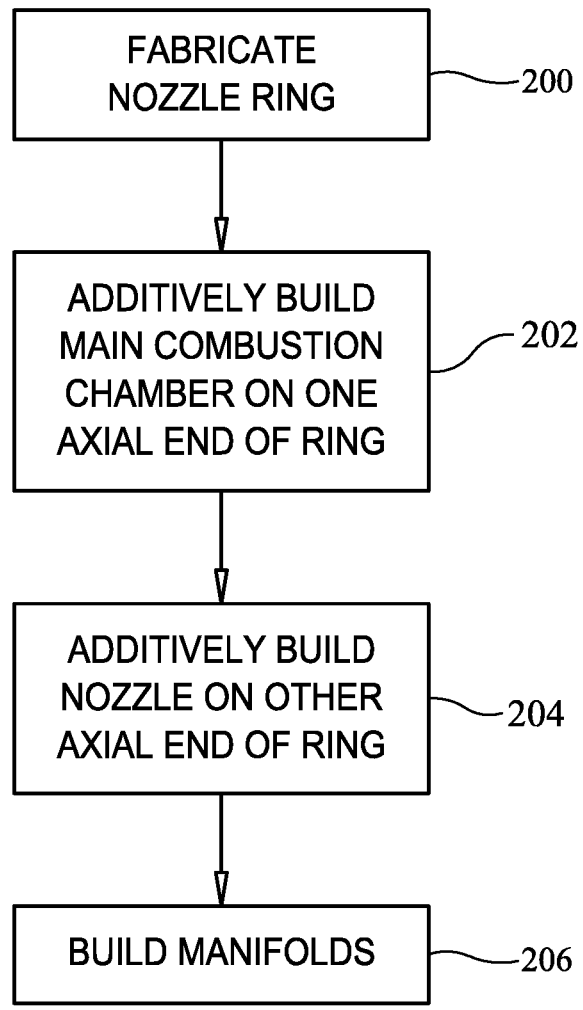
FIG. 4 is a flow diagram of a method used to fabricate the integrated main combustion chamber and nozzle in accordance with an embodiment of the present invention.

The above-described TCA embodiments are made possible by a novel process for the fabrication of MCC 20 and nozzle 30 as an integrated TCA liner requiring no seals or bolting at the interface of MCC 20 and nozzle 30, i.e., where outlet 24 interfaces with inlet 32. In describing this novel fabrication process, reference will be made to FIGS. 1-3, as well as to the process flow diagram presented in FIG. 4 and schematic drawings in FIGS. 5-8. As an initial step 200, a nozzle transition ring 36 (FIGS. 5-8) is fabricated from the stainless steel or superalloy that will be used for nozzle 30. Nozzle transition ring 36 will ultimately define inlet 32 of nozzle 30. The transition ring can include closed coolant channels extending axially there along to define the beginnings of the above-described nozzle coolant channels 38. The transition ring can also include the above-described ports 39 depending on the ultimate TCA design. For clarity of illustration, neither channels 38 nor ports 39 are illustrated in FIGS. 5-8.

Figure 5:
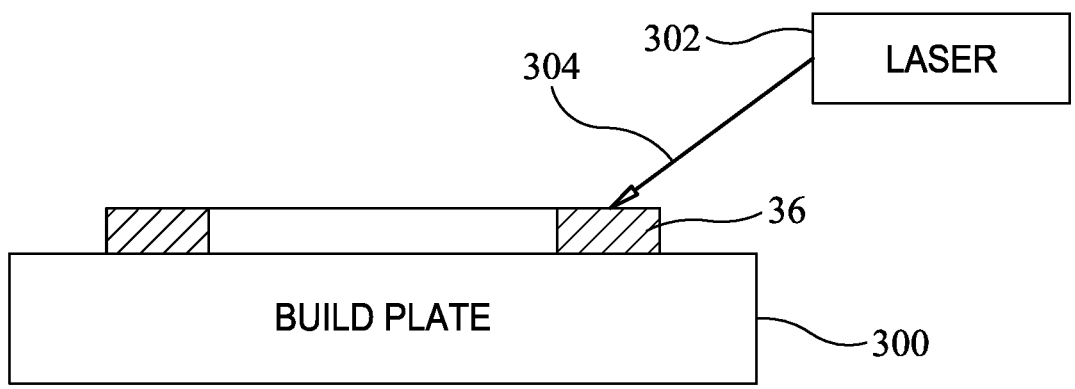
FIG. 5 is a schematic view of a Selective Laser Melting (SLM) set-up to fabricate a nozzle transition ring in accordance with an embodiment of the present invention.

Nozzle transition ring 36 is a thin (i.e., short in the axial dimension with a typical axial length or thickness being on the order of 0.015-0.025 inches) ring-shaped structure fabricated, deposited, or otherwise positioned upon a build plate 300 that is commonly used in additive manufacturing process such as Powder-bed Fusion (PBF) or Selective Laser Melting (SLM). One end face of the ring-shaped structure (i.e., one axial end) is used for the deposition/build of MCC 20, while the opposing end face (i.e., the other axial end) is used for the deposition/build of nozzle 30. As shown in FIG. 5, one axial end of transition ring 36 rests on build plate 300, while the opposing axial end of transition ring 36 is exposed. Nozzle transition ring 36 can be fabricated using PBF, SLM, or an alternate energy deposition or solid-state process such as Directed Energy Deposition (DED), coldspray, ultrasonic, or arc-wire cladding. Nozzle transition ring 36 may or may not include coolant channels depending on the design configuration of the TCA. For purposes of the ensuing description, it will be assumed that fabrication will proceed using an SLM system/process that includes a laser 302 capable of being controlled to produce a laser beam 304 of desired power.

The fabricated transition ring 36 is then used at step 202 in an additive manufacturing process to integrate MCC 20 with the ring. Briefly, step 202 employs a SLM (or PBF) layer-by-layer additive manufacturing process that builds a copper-alloy MCC 20 with the above-described integral coolant channels 28 and ports 29 onto the exposed axial end of the transition ring from step 200. In general, the build process of the present invention causes the copper-alloy MCC 20 to integrate with the transition ring. For example, the SLM process uses laser melting to integrate the copper-alloy with nozzle transition ring 36. Prior to the copper-alloy processing, transition ring 36 can have residual powder or contaminants removed from its surface. Further, although not required, the surface of transition ring 36 could be precision cleaned or etched to remove any oxides that might prevent or contaminate subsequent processing.

Figure 6:
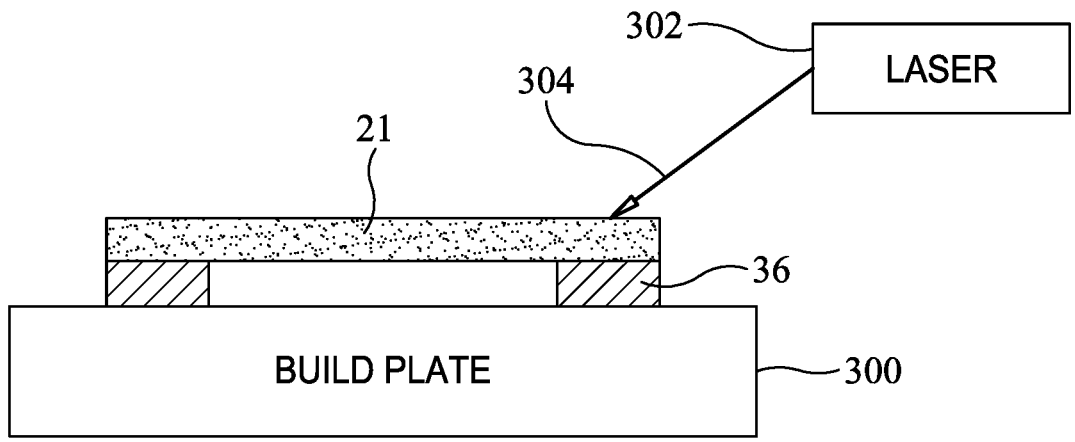
FIG. 6 is a schematic view of the SLM set-up at the beginning of the fabrication of a main combustion chamber (MCC) that results in an integrated nozzle transition ring and MCC interface in accordance with an embodiment of the present invention.
Figure 7:
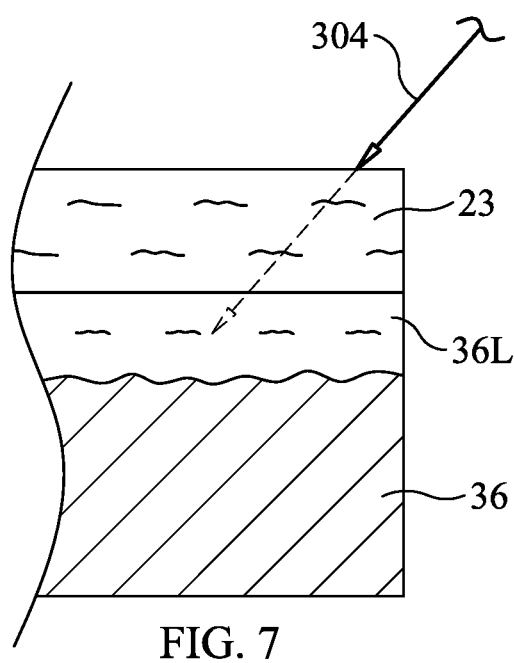
FIG. 7 is an enlarged schematic view illustrating a melted copper-alloy and melted portion of the nozzle transition ring.
Figure 8:
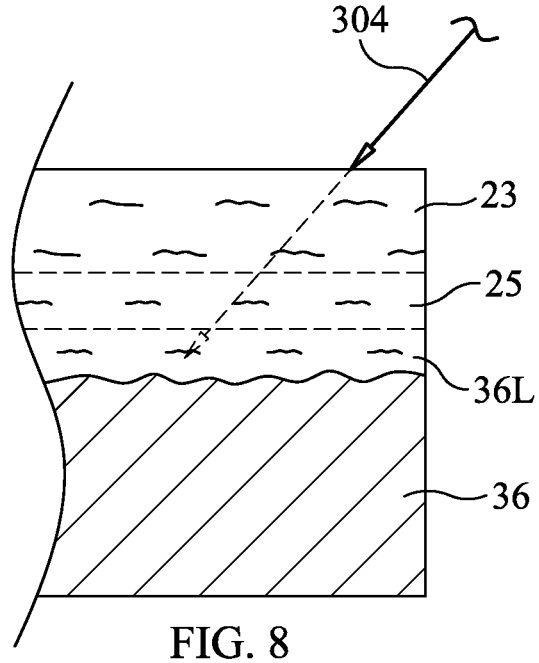
FIG. 8 is an enlarged schematic view illustrating the integrated region of the melted copper-alloy and melted nozzle transition ring.

Referring to FIG. 6, a base layer comprising copper-alloy powder 21 is deposited on the exposed axial end of the fabricated and solid nozzle transition ring 36. Typical thickness of powder 21 is in the range of approximately 0.002-0.012 inches. Laser 302 is then directed towards powder 21 and ring 36, and is operated/controlled such that the energy associated with laser beam 304 penetrates through copper-alloy powder 21 and partially into transition ring 36 as indicated by the dashed-line extension of laser beam 304 shown in FIG. 7. The power of laser beam 304 is selected such that copper-alloy powder 21 (FIG. 6) melts to form melted copper-alloy 23 (FIG. 7), and such that a portion 36L of transition ring 36 (adjacent to and just below melted copper-alloy 23) also melts to a liquid state. Once this occurs, adjoining portions of melted copper-alloy 23 and melted transition ring 36L intermix to form an integrated region 25 as shown in FIG. 8. The resulting intermetallic mixing allows for diffusion of the MCC's copper-alloy material into the transition ring's material. Laser beam 304 is then removed or turned off to allow the resulting liquefied regions 23, 25 and 36L to solidify to create a permanent and seal-free bond of the two materials.

Once solidified, integrated region 25 defines a functional gradient transition between what will become MCC 20 and nozzle 30 thereby preventing a step change between the materials used for MCC 20 and nozzle 30. That is, in transitioning from MCC 20 to nozzle 30, integrated region transitions from 100% of the MCC's material through a changing gradient of a mixture of the MCC's material and the nozzle's material before finally transitioning to 100% of the nozzle's material. The gradient function defined in integrated region 25 can be controlled using various process parameters.

The SLM process and design model used for fabrication can also be used to create relief features (e.g., surface roughness, fingers, etc.) on the outside surface of MCC 20. Such relief features improve adherence of a composite material overwrap as will be explained further below. Ports (not shown) at the outside surface of inlet 22 of MCC 20 are also included for fluidic communication with a manifold 40 encircling TCA LINER 10 at inlet 22 such that coolant fluid can be extracted from the MCC's coolant channels after passing there through. Following fabrication of the copper-alloy MCC to the nozzle transition ring, the entire assembly is removed from the build plate using processes commonly known in the art.

Next, at step 204, transition ring 36 and the built-up MCC coupled thereto are removed from build plate 300 so that the other axial end face of transition ring 36 fabricated in step 200 can be used as the base for an additive build of nozzle 30 to include its integrated coolant channels 38 and, if needed, ports 39. Ports (not shown) at the outside surface of outlet 34 of nozzle 30 are also included for fluid communication with manifold 40 encircling TCA LINER 10 at outlet 34. In general, the build process of the present invention causes the material used for nozzle 30 to integrate with the above-described transition ring 36. Since the materials used for nozzle 30 and transition ring 36 are the same, integration of the added layers forming nozzle 30 can follow standard build procedures. The fabrication process options for nozzle 30 include a freeform deposition technique (e.g., blown powder deposition, directed energy deposition, laser metal deposition, wire-fed laser deposition, electron beam deposition) or a solid-state additive deposition technique (e.g., coldspray, ultrasonic, friction stir) in which multi-axis or layer-by-layer additive manufacturing is applied. The coolant channels are formed integrally with the nozzle as it is being fabricated.

Finally, at step 206, the above-described TCA liner has manifolds 40 integrally coupled to the outside surface of the TCA liner using a freeform deposition process or a secondary welding operation to bond a subassembly of the manifolds. The design for the above-described builds of MCC 20 and nozzle 30 can include additional manifold land stock material for welding the manifolds. The welding of the manifolds to the manifold lands for the MCC can include an integral bimetallic, multi-metallic, or gradient material layer to transition from the copper-alloy to the stainless or superalloy. The processes for fabricating manifold lands can include any from a group of deposition techniques including directed energy deposition (i.e., blown powder deposition, arc-wire cladding) or solid-state deposition (i.e., coldspray, ultrasonic, plating). Conversely, the manifolds may be welded or bonded directly to the support structure fabricated during the manufacturing of the nozzle and MCC through means of laser welding or electron beam welding allowing for intermetallic mixing in the weld zone.

Figure 9:
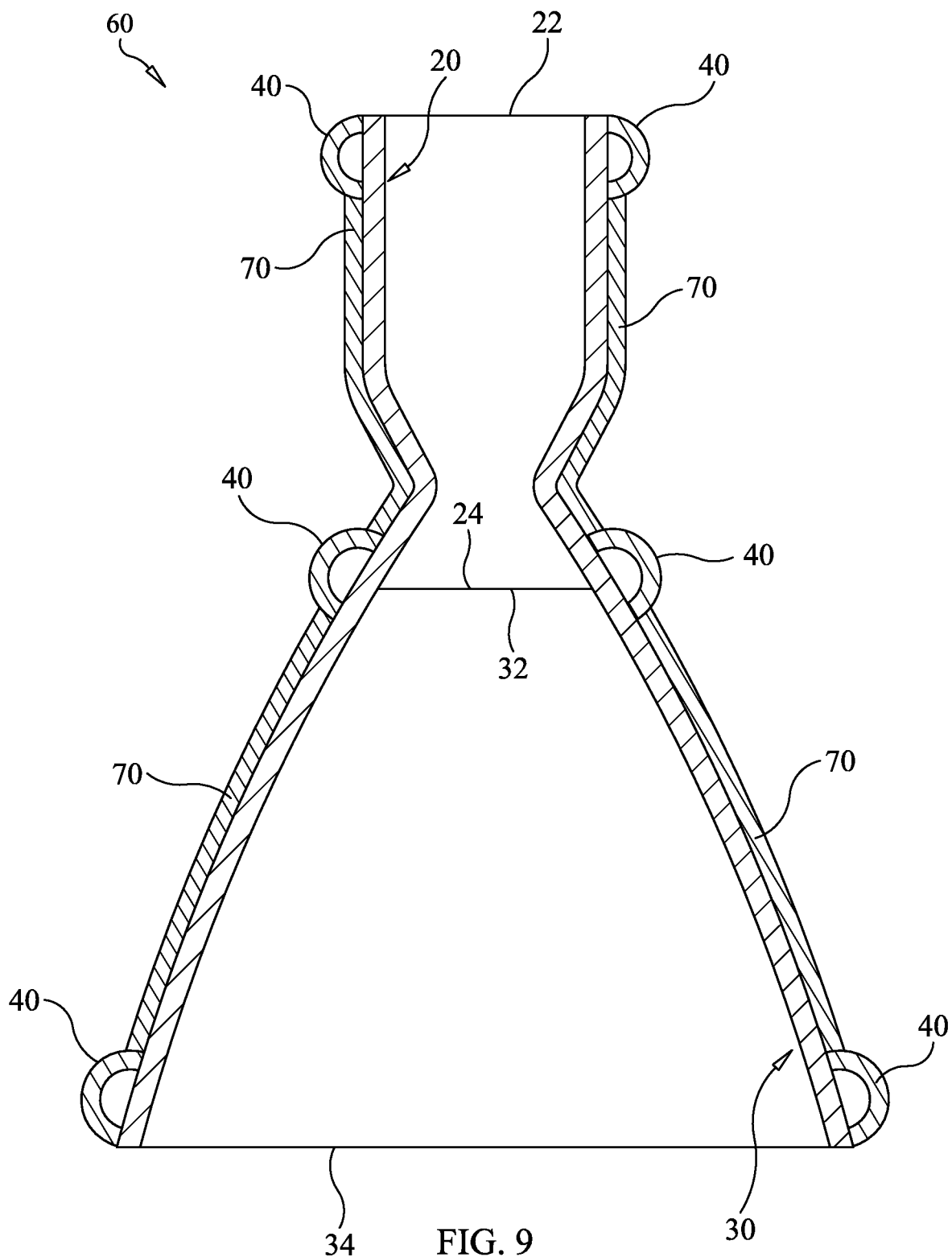
FIG. 9 is a cross-sectional view of an integrated thrust chamber liner and manifolds of a thrust chamber assembly to further include a composite overwrap in accordance with another embodiment of the present invention.

The TCA and fabrication thereof in accordance with the present invention can be further modified for reduced weight and increased strength in the face of radial pressure loads and axial thrust loads. Referring now to FIG. 9, a TCA liner 60 includes the features described above. Once again, the coolant channels shown in FIGS. 2-3 have been omitted from FIG. 9 for clarity of illustration. TCA liner 60 includes a composite overwrap 70 on exposed portions of MCC 20 and nozzle 30, i.e., overwrap 70 can be applied using any of a variety of known composite fabrication techniques without departing from the scope of the present invention. The techniques for applying the composite may include hand layup, filament winding, and tape wrap winding using wet and dry layup techniques. Materials used for composite overwrap 70 can include, for example, carbon fiber composites, fiber-reinforced polymer composites, metal matrix composites, and ceramic matrix composites. The composite binder material is selected based on the backside (i.e., the coldwall) temperatures and should be sufficient to withstand elevated temperatures (generally no greater than 500° F.), but also withstand cryogenic temperatures during startup of the engine and TCA.

The fabrication process to include a composite overwrap as described herein creates a seal-free TCA liner using reduced amounts of copper and stainless or superalloy to close out the coolant channels of MCC 20 and nozzle 30, respectively. The lighter and stronger composite overwrap 70 provides the needed strength at a reduced weight. The composite overwrap fabrication strategy uses varying fiber placement to provide strength to react axial thrust loads, radial pressure loads, thermal shocks and strains, and gimbaling loads. The composite overwrap fabrication can use relief features on the liner's outer surface such that the composite overwrap's weave patterns can react to the structural loads.

The use of a composite overwrap can also be employed in other TCA designs to reduce the amount of coolant channel close out material. For example, the amount of coolant channel closeout material used in the method disclosed in the U.S. Pat. No. 9,835,114 could be reduced when the above-described composite overwrap is employed.

Figure 10:
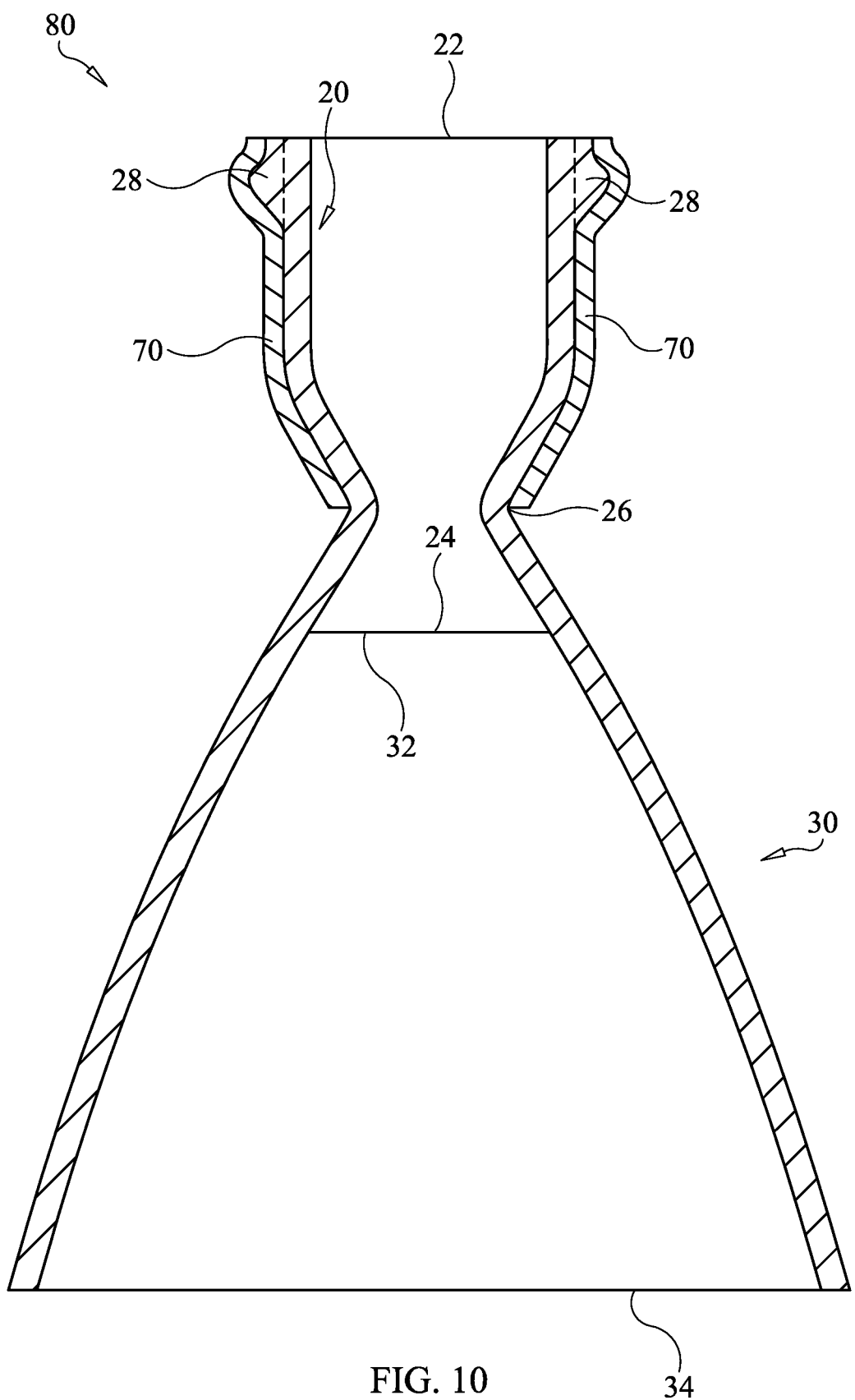
FIG. 10 is a cross-sectional view of a thrust chamber liner to include an annular protrusion and a composite overwrap bonded thereto in accordance with an embodiment of the present invention.

Another embodiment of the present invention that utilizes a unique and advantageous coupling scheme for the composite overwrap is illustrated in FIG. 10 and is referenced generally by numeral 80. For clarity of illustration, the above-described coolant channel manifolds and coolant channels have been omitted from FIG. 10, but would typically be provided in an actual construction of TCA liner 80.

TCA liner 80 integrates an annular protrusion or bump 28 that extends radially outward from the exterior surface of MCC 20 adjacent to its inlet 22. Annular bump 28 is additively built using the same stock material (e.g., a copper-alloy) used for the rest of MCC 20 to thereby be integrated with MCC 20. In general, annular bump 28 serves as the bonding location for composite overwrap 70 to lock overwrap 70 in place as operational loads are transferred thereto as will be explained below. An exemplary embodiment of annular bump 28 will now be explained with reference to FIG. 11 which depicts an enlarged view of the region in FIG. 10 that is within dashed-line circle 11.

Figure 11:
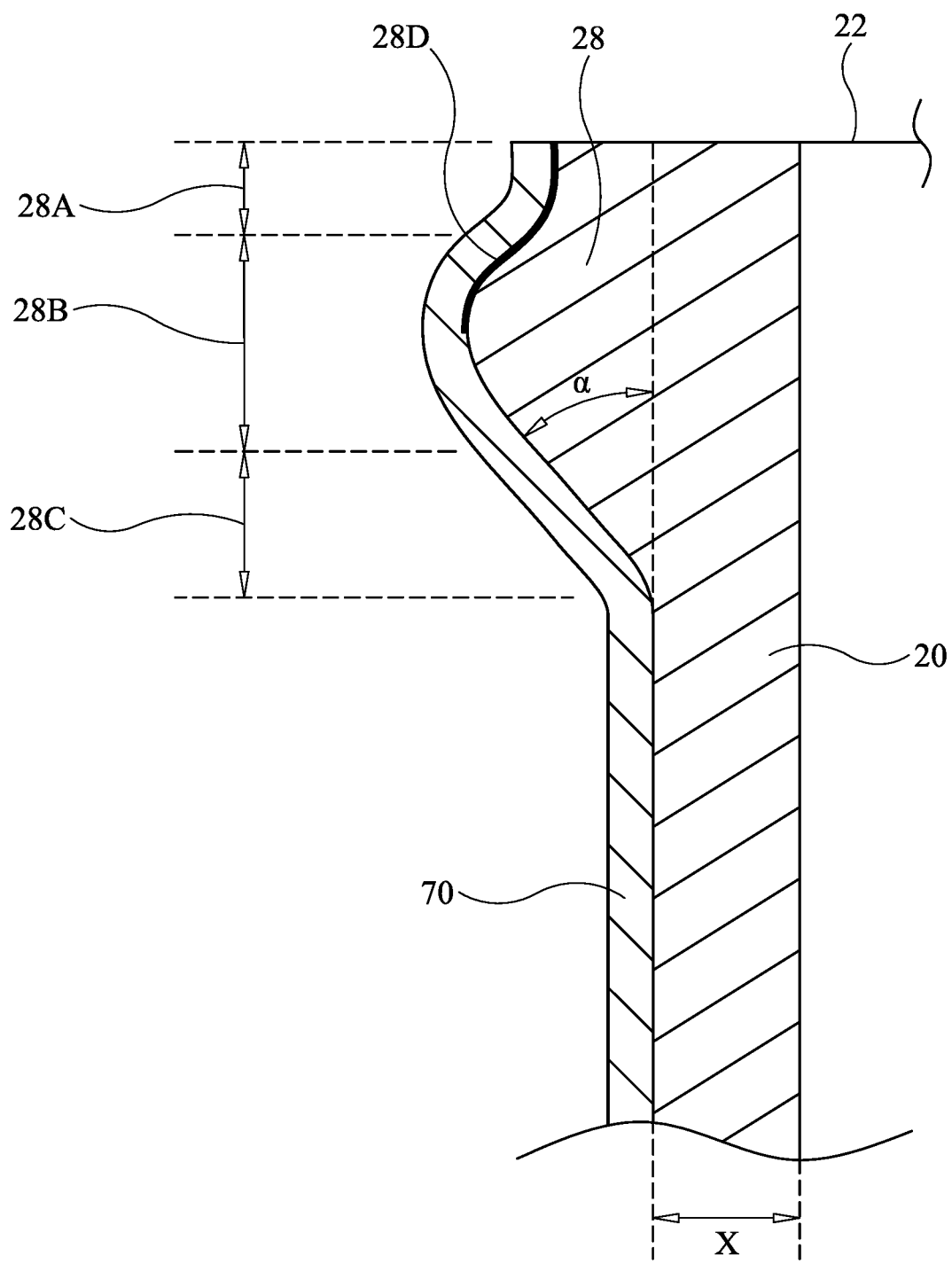
FIG. 11 is an enlarged cross-sectional view of the portion of the thrust chamber liner to include the annular protrusion and composite overwrap bonded thereto illustrated within the dashed-line circle depicted in FIG. 10.

In FIG. 11, annular bump 28 includes a constant-thickness forward region 28A adjacent to inlet 22, a varying-thickness arched region 28B integrated with forward region 28A, and a tapered-thickness aft region 28C integrated with arched region 28B. Each thickness is in the radial dimension of MCC 20. The overall (radial) wall thickness of MCC 20 (i.e., inclusive of the non-illustrated coolant channels) is indicated as "X". The radial thickness of forward region 28A is generally in the range of (0.5)X to (0.99)X. Forward region 28A helps transmit loads to the structure (not shown) interfacing with inlet 22. The maximum radial thickness of arched region 28B is generally in the range of (1.2)X to 3X. The maximum radial thickness of arched region 28B is primarily based on structural loads expected in MCC 20. The radial thickness of tapered region 28C tapers from its point of interface with arched region 28B to zero in accordance with an angle α that tapered region 28C makes with the outer wall surface of MCC 20, where angle α is in a range of 15-60°. Bonding of composite overwrap 70 to annular bump 28 occurs along the outside radial surface of forward region 28A and approximately half of the outside radial surface of arched region 28B. The bonding surface area is designated by dark line 28D in FIG. 11.

As described above, composite overwrap 70 can encase the entirety of MCC 20 and nozzle 30. However, it may not be necessary to encase the entire structure in composite overwrap 70 because the primary pressure and blow-off loads in MCC 20 are forward of throat 26. In the illustrated embodiment, composite overwrap 70 encases MCC 20 from annular bump 28 to throat 26 of MCC 20. More specifically, composite overwrap 70 is in intimate contact with MCC 20 but is only bonded thereto (e.g., mechanically, chemically, using adhesives, or any other acceptable bonding method) at annular bump 28 as described above for the exemplary embodiment. Annular bump 28 carries the "blow-off load" generated by the high chamber pressure acting on the convergent section of MCC 20. That pressure exerts a pulling force on throat 26 away from inlet 22. Forward region 28A is thicker than the wall of MCC 20 so that the load is transferred from composite overwrap 70 near throat 26 up to annular bump 28 and ultimately into the structure (not shown) forward of annular bump 28. Composite overwrap 70 also contains the pressure of MCC 20 in a hoop load.

Figure 12:
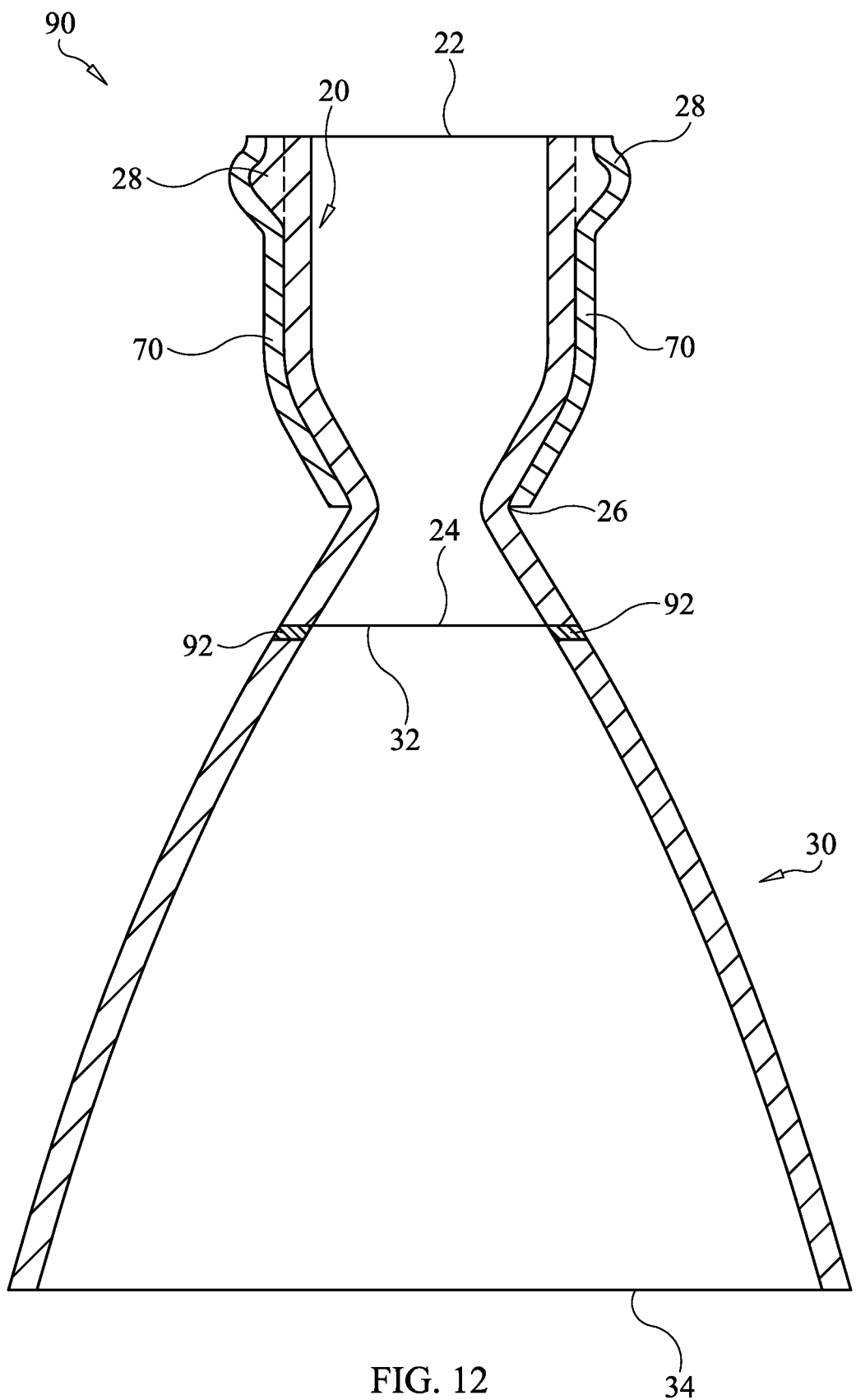
FIG. 12 is a cross-sectional view of a thrust chamber liner to include an annular protrusion and a composite overwrap bonded thereto in accordance with another embodiment of the present invention.

In still another embodiment of the present invention, fabrication commencement using the above-described nozzle transition ring can be omitted. FIG. 12 illustrates a TCA liner 90 additively built without the above-described nozzle transition ring serving at its starting point. FIGS. 13-15 illustrate a fabrication progression that is used to construct TCA liner 90. Once again and for clarity of illustration, the previously-described coolant channel manifolds and coolant channels have been omitted from FIGS. 12-15, but would typically be provided in an actual construction of TCA liner 90.

TCA liner 90 includes a thin (i.e., on the order of 0.02 inches or less) integrated interface region 92 disposed between MCC 20 and nozzle 30. As will be described further below, interface region 92 is an additively built feature fabricated onto the axial outlet end 24 of MCC 20 prior to the additive build of nozzle 30. Interface region 92 is a material that can be integrated with MCC 20 and nozzle 30 during the additive build process. For example, when MCC 20 is a copper-alloy and nozzle 30 is made from stainless steel, a superalloy or a refractory-alloy, interface region 92 can be a copper-nickel-alloy generally having at least 40 weight percent copper and at least 12 weight percent nickel.

The process of fabricating MCC 20 and nozzle 30 of TCA liner 90 will now be described with the aid of FIGS. 13-15 where key features of the fabrication process are illustrated. Referring first to FIG. 13, MCC 20 is additively built from a copper-alloy using a powder bed fusion process. The outlet end 24 of MCC 20 terminates in additional stock material, e.g., a copper-alloy. More specifically, steps or lands in the form of annular rings 29A and 29B are fabricated at the exterior and interior surfaces, respectively, of MCC 20. Ring 29A extends radially away from MCC 20 and ring 29B extends radially into MCC 20.

The process of appending/integrating nozzle 30 to MCC 20 begins with a pre-heating step. With reference to FIG. 14, outlet end 24 of MCC 20 is heated prior to the deposition of the above-described interface region 92. More specifically, outlet end 24 to include rings 29A/29B is heated (e.g., using a laser) to a temperature in a range of 80% to 98% of the melting temperature of the material used for MCC 20. Once heated to the appropriate temperature, interface region 92 is deposited on outlet 24 using a directed energy deposition process. Following the deposition of interface region 92, nozzle 30 is additively built using a directed energy deposition process. After nozzle 30 is built, the exposed or protruding portions of rings 29A/29B are removed (e.g., via machining, grinding, etching, and/or sanding) to yield the resulting structure illustrated in FIG. 15.

The advantages of the present invention are numerous. No seals or bolts are required at the MCC-to-nozzle interface thereby eliminating leak points and excess weight. The fabrication processes described herein improve a thrust chamber liner's structural integrity, load handling, and coolant fluid distribution. The liner fabrication processes facilitate the use of minimal coolant-channel closeout material with the composite overwrap feature providing the necessary strength at a reduced weight.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A thrust chamber liner for a rocket engine, comprising:
   a metallic combustion chamber having an injector opening and a throat opening at opposing axial ends of said combustion chamber, said combustion chamber including an annular protrusion extending radially away from an exterior surface of said combustion chamber adjacent to said injector opening;
   said annular protrusion including a constant radial-thickness region at said injector opening adapted to transmit loads to a structure coupled to said injector opening, an arched radial-thickness region integrated with said constant radial-thickness region, and a tapered radial-thickness region integrated with said arched radial-thickness region;
   a metallic nozzle coupled to said combustion chamber at said throat opening thereof; and
   a composite material encasing said exterior surface of said combustion chamber along at least a portion thereof and only bonded to said constant radial-thickness region and a portion of said arched radial-thickness region adjoining said constant radial-thickness region.

2. A thrust chamber liner as in claim 1, wherein said composite material is selected from the group consisting of carbon fiber composites, fiber-reinforced polymer composites, metal matrix composites, and ceramic matrix composites.

3. A thrust chamber liner as in claim 1, wherein said combustion chamber comprises a copper-alloy, and wherein said nozzle comprises a material selected from the group consisting of stainless steel, a superalloy, and a refractory-alloy.

4. A thrust chamber liner as in claim 3, further comprising a ring of a copper-nickel-alloy disposed between said combustion chamber and said nozzle.

5. A thrust chamber liner as in claim 4, wherein said copper-nickel-alloy comprises at least 40 weight percent copper and at least 12 weight percent nickel.

6. A thrust chamber liner as in claim 4, wherein said ring has a thickness less than 0.02 inches.

7. A thrust chamber liner as in claim 1, further comprising fluid-coupled coolant channels extending along said combustion chamber and said nozzle.

8. A thrust chamber liner as in claim 1, wherein said combustion chamber has a radial wall thickness X, and wherein a radial thickness of said constant radial-thickness region is in a range of $(0.5)X$ to $(0.9)X$, and wherein a maximum radial thickness of said arched radial-thickness region is in a range of $(1.2)X$ to $3X$.

9. A thrust chamber liner for a rocket engine, comprising:
   a combustion chamber made from a copper-alloy and having an injector opening and a throat opening at opposing axial ends of said combustion chamber, said combustion chamber further having an annular protrusion extending radially away from an exterior surface of said combustion chamber adjacent to said injector opening;
   said annular protrusion including a constant radial-thickness region at said injector opening adapted to transmit loads to a structure coupled to said injector opening, an arched radial-thickness region integrated with said constant radial-thickness region, and a tapered radial-thickness region integrated with said arched radial-thickness region;
   a nozzle made from a material selected from the group consisting of stainless steel, a superalloy, and a refractory-alloy, said nozzle coupled to said combustion chamber at said throat opening thereof; and
   a composite material encasing said exterior surface of said combustion chamber up to said throat opening thereof and only bonded to said constant radial-thickness region and a portion of said arched radial-thickness region adjoining said constant radial-thickness region.

10. A thrust chamber liner as in claim 9, wherein said composite material is selected from the group consisting of carbon fiber composites, fiber-reinforced polymer composites, metal matrix composites, and ceramic matrix composites.

11. A thrust chamber liner as in claim 9, further comprising a ring of a copper-nickel-alloy disposed between said combustion chamber and said nozzle.

12. A thrust chamber liner as in claim 11, wherein said copper-nickel-alloy comprises at least 40 weight percent copper and at least 12 weight percent nickel.

13. A thrust chamber liner as in claim 11, wherein said ring has a thickness less than 0.02 inches.

14. A thrust chamber liner as in claim 9, further comprising fluid-coupled coolant channels extending along said combustion chamber and said nozzle.

15. A thrust chamber liner as in claim 9, wherein said combustion chamber has a radial wall thickness X, and wherein a radial thickness of said constant radial-thickness region is in a range of (0.5)X to (0.9)X, and wherein a maximum radial thickness of said arched radial-thickness region is in a range of (1.2)X to 3X.

\* \* \* \* \*